United States Patent
McLin et al.

(10) Patent No.: US 12,209,035 B2
(45) Date of Patent: Jan. 28, 2025

(54) PROCESSES FOR REMOVING OIL FROM SEPARATED WATER STREAMS

(71) Applicant: ConocoPhillips Company, Houston, TX (US)

(72) Inventors: Kristie S. McLin, Houston, TX (US); Ramesh Sharma, Houston, TX (US); Gregory A. Deslaurier, Houston, TX (US); Reinaldo G. Carrasco, Houston, TX (US); James B. Buzan, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 16/031,178

(22) Filed: Jul. 10, 2018

(65) Prior Publication Data

US 2019/0016611 A1 Jan. 17, 2019

Related U.S. Application Data

(60) Provisional application No. 62/531,651, filed on Jul. 12, 2017.

(51) Int. Cl.
| | |
|---|---|
| C02F 1/40 | (2023.01) |
| C02F 1/00 | (2023.01) |
| C02F 1/28 | (2023.01) |
| C02F 1/38 | (2023.01) |
| C02F 1/44 | (2023.01) |

(Continued)

(52) U.S. Cl.
CPC .............. *C02F 1/385* (2013.01); *C02F 1/004* (2013.01); *C02F 1/283* (2013.01); *C02F 1/38* (2013.01); *C02F 1/40* (2013.01); *C02F 1/444* (2013.01); *C02F 2101/32* (2013.01);
(Continued)

(58) Field of Classification Search
None
See application file for complete search history.

(56) References Cited

U.S. PATENT DOCUMENTS 3,894,814 A * 7/1975 Morgan ................ E21B 43/121
  417/128
4,398,603 A * 8/1983 Rodwell ................ E21B 43/35
  166/57

(Continued)

FOREIGN PATENT DOCUMENTS

CN 2716504 * 10/2005
CN 204138463 U * 2/2015

(Continued)

OTHER PUBLICATIONS

Green Parts, Glossary: Parts-per million, https://www.greenfacts.org/glossary/pqrs/parts-per-million-ppm.htm#:~:text=Parts%20per%20million%20(ppm)%20is,solid%20(mg%2Fkg). Downloaded Nov. 20, 2020. (Year: 2020).*

(Continued)

*Primary Examiner* — Chester T Barry
(74) *Attorney, Agent, or Firm* — Polsinelli PC

(57) ABSTRACT

The present disclosure provides processes for removing hydrocarbons, oil coated solids, and suspended solids from a separated water stream produced from a produced water source. In particular, the methods comprise subjecting the separated water stream to a centrifugal separation followed by filtration.

20 Claims, 9 Drawing Sheets
(7 of 9 Drawing Sheet(s) Filed in Color)

(51) Int. Cl.
*C02F 101/32* (2006.01)
*C02F 103/10* (2006.01)

(52) U.S. Cl.
CPC .... *C02F 2103/10* (2013.01); *C02F 2201/008* (2013.01); *C02F 2303/16* (2013.01)

(56) References Cited

U.S. PATENT DOCUMENTS

| | | | | |
|---|---|---|---|---|
| 5,143,603 A * | 9/1992 | Gibbs | ............... | B01D 17/0214 210/138 |
| 5,350,525 A * | 9/1994 | Shaw | ............... | B01D 17/00 210/744 |
| 6,077,433 A * | 6/2000 | Brun Henriksen | ............... | B01D 11/0492 210/634 |
| 7,374,529 B2 * | 5/2008 | Hensley | ............... | B04B 1/20 494/53 |
| 7,507,329 B2 * | 3/2009 | Pinho | ............... | B01D 17/06 208/263 |
| 7,516,794 B2 | 4/2009 | Gramme | | |
| 8,221,633 B2 * | 7/2012 | Lam | ............... | B01D 17/0217 210/788 |
| 8,662,160 B2 * | 3/2014 | DeWitt | ............... | E21B 7/14 166/77.1 |
| 9,140,106 B2 * | 9/2015 | Rexilius | ............... | E21B 43/122 |
| 10,913,013 B2 * | 2/2021 | Sams | ............... | B01D 21/0084 |
| 2005/0034869 A1 | 2/2005 | Appleford | | |
| 2006/0243670 A1 * | 11/2006 | Pinchin | ............... | B01F 21/30 210/748.11 |
| 2007/0102359 A1 * | 5/2007 | Lombardi | ............... | B01D 17/085 210/639 |
| 2008/0115933 A1 * | 5/2008 | Wilson | ............... | E21B 43/168 166/250.07 |
| 2008/0221798 A1 | 9/2008 | Pariag | | |
| 2010/0059451 A1 * | 3/2010 | Gallo | ............... | B01D 17/0208 210/708 |
| 2011/0011584 A1 | 1/2011 | Bernays | | |
| 2011/0174695 A1 * | 7/2011 | Goldman | ............... | B01D 17/047 208/390 |
| 2013/0075335 A1 * | 3/2013 | Prakash | ............... | B01D 61/58 210/640 |
| 2013/0319663 A1 * | 12/2013 | Buchanan | ............... | E21B 43/2406 166/272.3 |
| 2015/0122481 A1 * | 5/2015 | Janjua | ............... | C02F 9/00 166/75.12 |
| 2015/0337218 A1 * | 11/2015 | Ricotta | ............... | E21B 43/00 208/187 |
| 2016/0091358 A1 * | 3/2016 | Fraser | ............... | G01F 1/8436 73/1.16 |
| 2017/0016309 A1 * | 1/2017 | Broze | ............... | E21B 43/0175 |
| 2017/0073252 A1 * | 3/2017 | Munisteri | ............... | B01D 17/0208 |
| 2017/0106950 A1 * | 4/2017 | Khachaturian | ............... | B63B 35/44 |
| 2017/0158538 A1 * | 6/2017 | Seth | ............... | B01D 71/56 |
| 2017/0204710 A1 * | 7/2017 | Hilber | ............... | E21B 43/122 |
| 2017/0284853 A1 * | 10/2017 | Ahmad | ............... | G01F 25/17 |
| 2018/0023804 A1 * | 1/2018 | Qin | ............... | F16T 1/00 126/609 |
| 2018/0250656 A1 * | 9/2018 | Mishra | ............... | B01J 20/3293 |
| 2018/0274347 A1 * | 9/2018 | Ricotta | ............... | E21B 43/34 |
| 2019/0169057 A1 * | 6/2019 | Heimel | ............... | B01D 61/58 |
| 2019/0232195 A1 * | 8/2019 | Alper | ............... | C02F 1/004 |
| 2020/0040671 A1 * | 2/2020 | Shilling, III | ............... | E21B 15/02 |
| 2020/0087173 A1 * | 3/2020 | Raynel | ............... | C02F 1/4674 |
| 2020/0109065 A1 * | 4/2020 | Govindan | ............... | B01D 17/02 |

FOREIGN PATENT DOCUMENTS

| | | | | |
|---|---|---|---|---|
| CN | 106390633 A * | 2/2017 | | |
| EP | 2021106 A1 * | 2/2009 | ............ | B01D 61/58 |
| EP | 2490818 | 8/2012 | | |
| NO | 310694 B1 * | 8/2001 | ............ | E21B 23/08 |
| WO | 2003033872 A1 | 4/2003 | | |
| WO | 2012146941 A1 | 11/2011 | | |
| WO | 2013091719 A1 | 6/2013 | | |
| WO | 2013156535 A1 | 10/2013 | | |
| WO | 2014145349 A2 | 9/2014 | | |
| WO | 2014152585 A1 | 9/2014 | | |
| WO | 2019014208 A1 | 1/2019 | | |

OTHER PUBLICATIONS

Seureau, J.; Aurelle, Y.; Hoyack, M., A three-phase separator for the removal of oil and solids from produced water, SPE Annual Technical Conference and Exhibition, 1994; Society of Petroleum Engineers (1994) (Year: 1994).*

Belaidi et al., "The Effect of Oil and Gas Content on the Controllability and Separation in a De-Oiling Hydroclone," Trans IChemE, vol. 81, Part A, Mar. 2003, p. 305-314 (Year: 2003).*

Process Group product website, "Hydroclones Deoiling," Rev. Nov. 2012, https://processgroupintl.com/media/downloads/D01_Deoiler_Cyclones_rev_11-12.pdf, (downloaded Mar. 4, 2021). (Year: 2012).*

Sayda, et al., "Modeling and Control of Three-Phase Gravity Separators in Oil Production Facilities," Proceedings of the 2007 American Control Conference, New York City, Jul. 11-13, 2007, p. 4847-4853 (Year: 2007).*

Triwibowo et al., "Modeling and simulation of steady state model approach for horizontal three phase separator (HTPS)," AIP Conference Proceedings 1818, 020062 (2017) (published online Mar. 10, 2017), p. 020062-1 through 020062-6. (Year: 2017).*

In re Gorman, 933 F.2d 982, 18 U.S.P.Q.2d 1885 (Fed. Cir. 1991) (Year: 1991).*

International Search Report and Written Opinion dated Sep. 14, 2018 from related international application No. PCT/US18/41421, 8 pp.

English translation of CN 2716504 dated Aug. 10, 2005, 3 pp.

* cited by examiner

PROCESSES FOR REMOVING OIL FROM SEPARATED WATER STREAMS

CROSS-REFERENCE TO RELATED APPLICATIONS

This application claims priority to U.S. Provisional Application Ser. No. 62/531,651, filed Jul. 12, 2017, the disclosure of which is hereby incorporated by reference in its entirety.

FIELD OF THE INVENTION

The present disclosure relates to processes for removing hydrocarbons and suspended solids from a separated water stream produced from a produced water source.

BACKGROUND OF THE INVENTION

Water, especially in the western United States and other arid regions, is a valuable resource. Many oil and natural gas production operations generate, in addition to the desired hydrocarbon products, large quantities of waste water, referred to as "produced water". Produced water is typically contaminated with significant concentrations of chemicals and substances requiring that it be disposed of or treated before it can be reused or discharged to the environment or deep well injected. Produced water includes natural contaminants that come from the subsurface environment, such as hydrocarbons from the oil- or gas-bearing strata and inorganic salts. Produced water may also include man-made compounds, such as drilling mud, "frac flow back water" that includes spent fracturing fluids including polymers and inorganic cross-linking agents, polymer breaking agents, friction reduction chemicals, and artificial lubricants. These compounds are injected into the wells as part of the drilling and production processes and recovered in the produced water.

What is needed, therefore, is a process for removing hydrocarbons and solids from a separated water stream.

SUMMARY OF THE INVENTION

One aspect of the present disclosure is directed to a process for removing hydrocarbons from a separated water stream having a hydrocarbon concentration of at least about 0.1% by weight to produce a treated water stream. The process comprises (a) feeding the separated water stream into a cyclonic deoiler to form an oil phase and a water phase; and (b) feeding the water phase through a filter system to remove solids thereby forming the treated water stream; wherein the treated water stream has a hydrocarbon concentration of less than about 0.01% by weight, and the cyclonic deoiler and the filter system are mounted on a mobile platform.

Other aspects and iterations of the disclosure are described in more detail below.

BRIEF DESCRIPTION OF THE FIGURES

The application file contains at least one drawing executed in color. Copies of this patent application publication with color drawing(s) will be provided by the Office upon request and payment of the necessary fee.

(FIG. 8A) depicts a graph showing the hydrocarbon concentration of the water inlet and water outlet of gun-barrel #1. (FIG. 8B) depicts a graph showing the hydrocarbon concentration of the water inlet and water outlet of gun-barrel #1 as function of time. (FIG. 8C) depicts a graph showing the hydrocarbon concentration of the water inlet and water outlet of gun-barrel #2. (FIG. 8D) depicts a graph showing the hydrocarbon concentration of the water inlet and water outlet of gun-barrel #2 as function of time.

DETAILED DESCRIPTION

Provided herein are efficient processes for removing hydrocarbons and total suspended solids from separated water streams derived from produced water generated during onshore oil and gas applications. In general, the separated water stream has a hydrocarbon concentration of at least about 0.1% by weight and may comprise hydrocarbon concentrations of greater than 5% by weight. The processes comprise feeding the separated water stream to a compact cyclonic bulk oil water separator (or deoiler), thereby forming a water phase and an oil phase. The processes further comprise feeding water phase through a filter system to remove solids and form a treated water stream in which the hydrocarbon concentration is less than about 0.01% by weight. The treated water stream may be recycled, reused, or disposed in an injection well. The cyclonic deoiler and filtration system are mounted on a platform to render it mobile, thereby increasing the flexibility of the process and reducing costs for the operator.

(I) Method

One aspect of the present disclosure encompasses a process for removing hydrocarbons from a separated water stream having a hydrocarbon concentration of at least about 0.1% by weight. The process comprises feeding the separated water stream into a cyclonic deoiler, wherein a centrifugal separation process form an oil phase and a water phase, and subjecting the water phase to a filtration process to produce a treated water stream.

Figure 1:
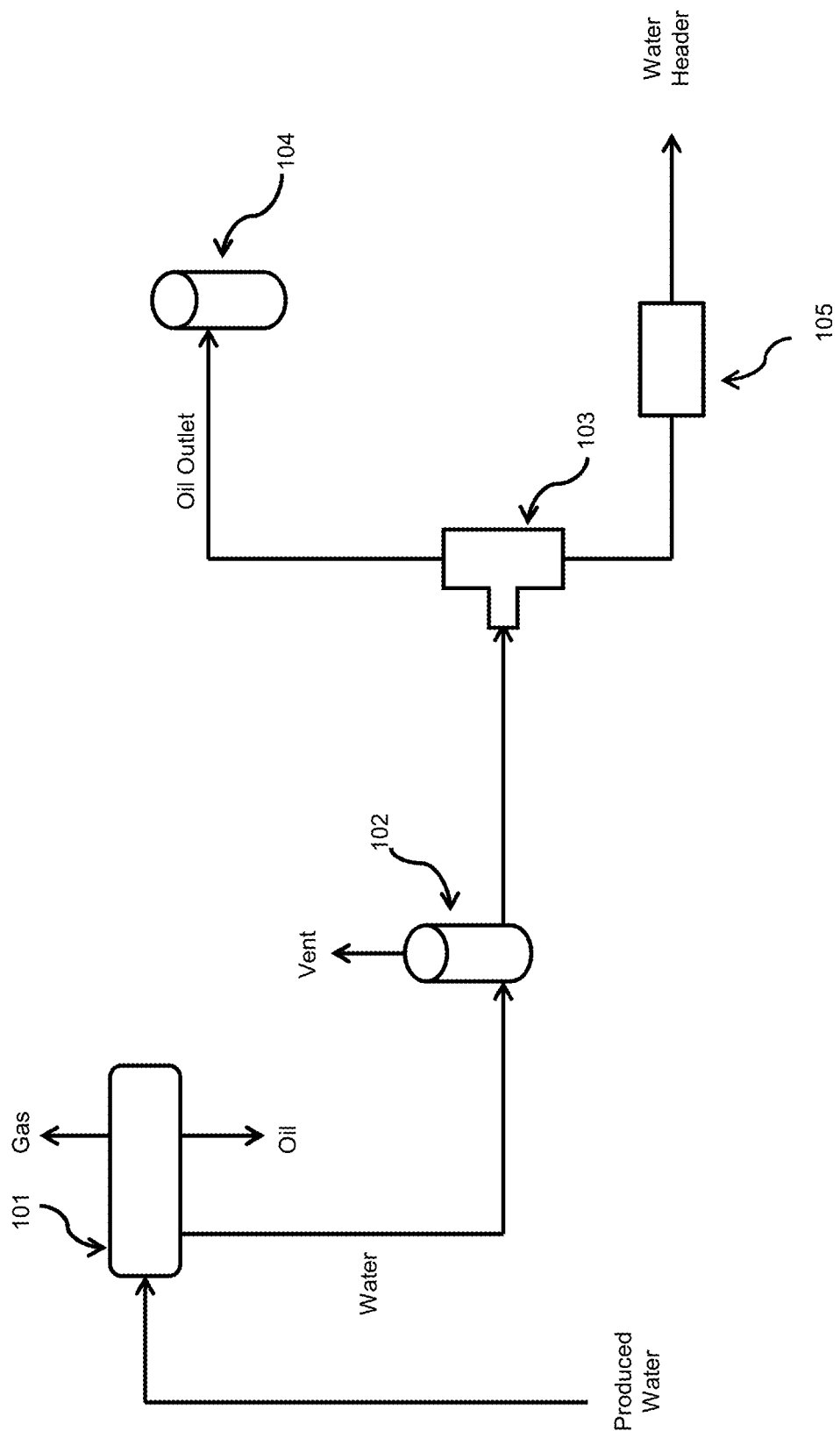
FIG. 1 depicts a simplified process flow diagram for the deoiler pilot test.

Generally, produced water extracted from a subterranean reservoir is brought to the surface through the wellhead. As shown in FIG. 1, produced water is fed to a 3-phase separator 101. The 3-phase separator 101 separates produced water into separated oil, separated gas, and separated water components. The separated gas is collected, compressed, and used for gas lift. Excess gas, not needed for the gas lift, may enter the sales line. Separated oil is transported to oil storage tanks for sale. Separated water is fed to a storage water tank 102. Separated water stored in a storage water tank 102 is fed into a cyclonic deoiler 103 or the water may by-pass storage tank 102 and go directed to the deoiler 103. The deoiler 103 separates the separated water into an oil phase and a water phase. The oil phase exits the deoiler 103 through a top reject and is fed to an oil tank/heater treater 104. The water phase exits the deoiler 103 through a bottom reject and is fed to a backwashable filter 105 to produce a treated water stream. The treated water stream may then be disposed of through various methods.

Figure 2:
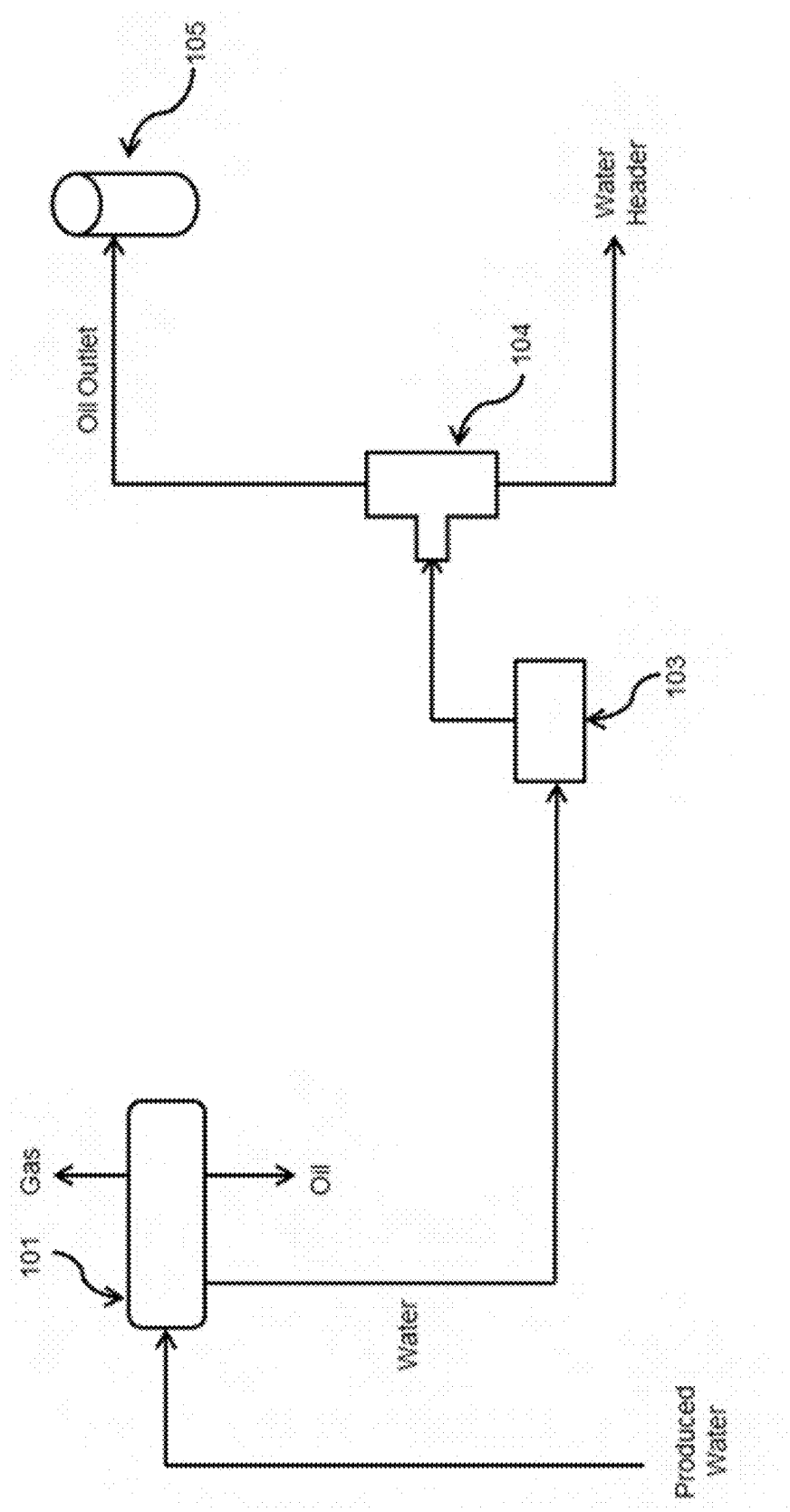
FIG. 2 depicts a simplified alternative process flow diagram for the deoiler pilot test.

Alternatively, produced water extracted from a subterranean reservoir is brought to the surface through the wellhead. As shown in FIG. 2, produced water is fed to a 3-phase separator 101. The 3-phase separator 101 separates produced water into separated oil, separated gas, and separated water components. The separated gas is collected, compressed, and used for gas lift. Excess gas, not needed for the gas lift, may enter the sales line. Separated oil is transported to oil storage tanks for sale. Separated water is fed into a cyclonic deoiler 103. The deoiler 103 separates the separated water into an oil phase and a water phase. The oil phase exits the deoiler 103 through a top reject and is fed to an oil tank/heater treater 104. The water phase exits the deoiler 103 through a bottom reject and is fed to a backwashable filter 105 to produce a treated water stream. The treated water stream may then be disposed of through various methods.

Each of the components of the processes is detailed below.

(a) Separated Water Stream

The process disclosed herein comprises removing hydrocarbons and suspended solids from a separated water stream. In general, the separated water stream is derived from a produced water stream by passing the produced water stream through a three-phase separator, as described above.

The separated water stream may comprise hydrocarbons. In an embodiment, the separated water stream may comprise a hydrocarbon concentration of at least about 0.1% by weight. In some embodiments, the separated water stream may comprise a hydrocarbon concentration of at least about 0.2%, at least about 0.3%, at least about 0.4%, at least about 0.5%, at least about 0.6%, at least about 0.7%, at least about 0.8%, at least about 0.9%, at least about 1.0%, at least about 1.5%, at least about 2.0%, at least about 2.5%, at least about 3.0%, at least about 3.5%, at least about 4.0%, at least about 4.5%, at least about 5.0%, at least about 5.5%, at least about 6.0%, at least about 6.5%, or at least about 7.0% by weight.

The separated water stream may comprise suspended solids. Suspended solids generally are classified as particles that are larger than 2 microns. The suspended solids may comprise, without limit, pump wear, formation deposits, sand, oil carryover, drilling mud, etc. In certain embodiments, the separated water stream may comprise about 0.01% to about 1.0% by weight suspended solids. In some embodiments, the separated water stream may comprise about 0.01%, about 0.02%, about 0.02%, about 0.04%, about 0.05%, about 0.06%, about 0.07%, about 0.08%, about 0.09%, about 0.1%, about 0.15%, about 0.2%, about 0.25%, about 0.3%, about 0.35%, about 0.4%, about 0.45%, about 0.5%, about 0.55%, about 0.6%, about 0.65%, about 0.7%, about 0.75%, about 0.8%, about 0.85%, about 0.9%, about 0.95%, or about 1.0% by weight suspended solids.

Suspended solids may reduce the clarity of water by creating an opaque, hazy, or muddy appearance. Turbidity of water is based on the amount of light scattered by particles (e.g., suspended solids) in the water.

The separated water stream may have increased turbidity relative to the treated water stream. In certain embodiments, the turbidity of the separated water stream may be greater than about 1,000 Nephelometric Turbidity Units (NTU). In some embodiments, the turbidity of the separated water stream may be greater than about 1,250 NTU, greater than about 1,500 NTU, greater than about 1,750 NTU, greater than about 2,000 NTU, greater than about 2,250 NTU, greater than about 2,500 NTU, greater than about 2,750 NTU, or great than about 3,000 NTU.

The separated water stream may comprise hydrogen sulfide ($H_2S$). In certain embodiments, the separated water stream may comprise more than about 0.01% by weight hydrogen sulfide. In additional embodiments, the separated water stream may comprise less than about 0.01% by weight hydrogen sulfide. In some embodiment, the separated water stream may comprise less than about 0.005%, less than about 0.001%, less than about 0.0009%, less than about 0.0008%, less than about 0.0007%, less than about 0.0006%, or less than about 0.0005% by weight hydrogen sulfide.

The separated water stream may comprise dissolved oxygen. In some embodiments, the separated water stream may comprise more than about $1\times10^{-7}$% by weight dissolved oxygen. In certain embodiments, the separated water stream may comprise less than about $1\times10^{-7}$% by weight dissolved oxygen. In some embodiments, the separated water stream may comprise less than about $9\times10^{-8}$%, less than about $8\times10^{-8}$%, less than about $7\times10^{-8}$%, less than about $6\times10^{-8}$%, less than about $5\times10^{-8}$%, less than about $4\times10^{-8}$%, less than about $3\times10^{-8}$%, less than about $2\times10^{-8}$%, or less than about less than about $1\times10^{-8}$% dissolved oxygen.

The separated water stream may comprise metal ions. The metal ions may comprise, without limit, aluminum, barium, boron, cadmium, chromium, copper, iron, lead, lithium, manganese, mercury, nickel, potassium, selenium, silver, strontium, sodium, zinc. In a preferred embodiment, the separated water stream may comprise iron ions. In certain embodiments, the separated water stream may comprise about 0.006% to about 0.013% by weight of a metal ion. In some embodiments, the separated water stream may comprise about 0.006%, about 0.0065%, about 0.007%, about 0.0075%, about 0.008%, about 0.0085%, about 0.009%, about 0.0095%, about 0.01%, about 0.0105%, about 0.011%, about 0.0115%, about 0.012%, about 0.0125%, to about 0.013% by weight of a metal ion.

(b) Centrifugal Separation Step

The process described herein comprises a step of subjecting a separated water stream to a centrifugal separation process thereby producing an oil phase and a water phase. In general, the centrifugal separation process comprises feeding the separated water stream to a cyclonic deoiler. In some embodiments, the centrifugal separation process may be accomplished by any deoiling technology known to those skilled in the art.

Cyclonic deoilers are commercially available from a variety of sources including Sulzer, Krebs/FLSmidth, Enerscope Systems, Fjord Processing, Fluid Technologies, FMC, Suez, E-process, Cameron, and other commercial providers.

In an embodiment, the cyclonic deoiler may comprise a plurality of liners. In some embodiments, the cyclonic deoiler may comprise from 1 to 60 liners. In some embodiments, the cyclonic deoiler may comprise 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 53, 54, 55, 56, 57, 58, 59, or 60 liners. In some embodiments, the cyclonic deoiler may comprise 30 liners. In another embodiment, the cyclonic deoiler may comprise 50 liners.

In an embodiment, the liner may comprise an inlet port and a reject port.

In an embodiment, the inlet port may have a diameter of from about 30 mm to about 200 mm. In some embodiments, the inlet port may have a diameter of about 30 mm, about 35 mm, about 40 mm, about 45 mm, about 50 mm, about 55 mm, about 60 mm, about 65 mm, about 70 mm, about 75 mm, about 80 mm, about 85 mm, about 90 mm, about 95 mm, about 100 mm, about 105 mm, about 110 mm, about 115 mm, about 120 mm, about 125 mm, 127 mm, about 130 mm, about 135 mm, about 137 mm, about 140 mm, about 145 mm, about 150 mm, about 152 mm, about 155 mm, about 160 mm, about 165 mm, about 170 mm, about 175 mm, about 177 mm, about 180 mm, about 185 mm, about 190 mm about 195 mm, or about 200 mm.

In an embodiment, the reject port may have a diameter of from about 2 mm to about 20 mm. In some embodiments, the reject port may have a diameter of about 2 mm, about 2.5 mm, about 3 mm, about 3.5 mm, about 4 mm, about 4.5 mm, about 5 mm, about 5.5 mm, about 6 mm, about 6.5 mm, about 7 mm, about 7.5 mm, about 8 mm, about 8.5 mm, about 9 mm, about 9.5 mm, about 10 mm, about 10.5 mm, about 11 mm, about 11.5 mm, about 12 mm, about 12.5 mm, about 13 mm, about 13.5 mm, about 14 mm, about 14.5 mm, about 15 mm, about 15.5 mm, about 16 mm, about 16.5 mm, about 17 mm, about 17.5 mm, about 18 mm, about 18.5 mm, about 19 mm, about 19.5 mm, or about 20 mm.

In an embodiment, the liner may have a length of from about 36" to about 72". In some embodiments, the liner may have a length of about 36", about 38", about 40", about 42", about 44", about 46", about 48", about 50", about 52", about 54", about 56", about 58", about 60", about 62", about 64", about 65", about 66", about 68", about 70", or about 72".

In an embodiment, the cyclonic deoiler may be operated using co-current and counter-current spin. In a different embodiment, the cyclonic deoiler may be operated using co-current spin. In an additional embodiment, the cyclonic deoiler may be operated using counter-current spin.

In an embodiment, the cyclonic deoiler may be operated at a G force of from about 1000 G to about 100 G. In some embodiments, the cyclonic deoiler may be operated at a G force of about 1000 G, about 900 G, about 800 G, about 700 G, about 600 G, about 500 G, about 400 G, about 300 G, about 200 G, or about 100 G. In certain embodiments, the cyclonic deoiler may be operated at a G force of less than about 800 G.

In an embodiment, the liner may have a capacity of between 800 bbl/day to about 5,000 bbl/day per liner. In some embodiments, the liner may have a capacity of about 800, about 900, about 1,000, about 1,500, about 2,000, about 2,500, about 3,000, about 3,500, about 4,000, about 4,500, or about 5,000 bbl/day per liner.

In an embodiment, the cyclonic deoiler may have a capacity of between 800 bbl/day to about 250,000 bbl/day. In some embodiments, the cyclonic deoiler may have a capacity of about 800, about 1,000, about 2,000, about 3,000, about 4,000, about 5,000, about 10,000, about 20,000, about 30,000, about 40,000, about 50,000, about 60,000, about 70,000, about 80,000, about 90,000, about 100,000, about 110,000, about 120,000, about 130,000, about 140,000, about 150,000, about 160,000, about 170,000, about 180,000, about 190,000, about 200,000, about 210,000, about 220,000, about 225,000, or about 250,000 bbl/day.

In an embodiment, the cyclonic deoiler may have a reject ratio of from about 1% to about 10%. In some embodiments, the cyclonic deoiler may have a reject ratio of about 1%, about 2%, about 3%, about 4%, about 5%, about 6%, about 7%, about 8%, about 9%, or about 10%.

In an embodiment, the separated water stream may enter the cyclonic deoiler at a pressure from about 50 psi to about 200 psi. In an additional embodiment, the separated water stream may enter the cyclonic deoiler at a pressure from about 90 psi to about 100 psi. In some embodiments, the separated water stream may enter the cyclonic deoiler at a pressure from about 50 psi to about 200 psi, from about 60 to about 190 psi, from about 70 psi to about 180 psi, from about 60 psi to about 170 psi, from about 70 psi to about 160 psi, from about 80 psi to about 150 psi, from about 90 psi to about 160 psi, from about 90 psi to about 150 psi, from about 90 psi to about 140 psi, from about 90 psi to about 130 psi, from about 90 psi to about 120 psi, from about 90 psi to about 110 psi, or from about 90 psi to about 100 psi.

In an embodiment, the cyclonic deoiler may have a pressure differential ratio of about 1.80 to about 2.05. In some embodiments, the cyclonic deoiler may have a pressure differential ratio of 1.90, 1.91, 1.92, 1.93, 1.94, 1.95, 1.96, 1.97, 1.98, 1.99, 2.0, 2.01, 2.03, 2.04, or 2.05. The pressure differential ratio (PDR) is calculated as follows:

$$PDR = \frac{(Pi - Pr)}{(Pi - Pw)}$$

Wherein Pi=inlet pressure; Pr=pressure at the reject port; and Pw=pressure at the water outlet stream.

In an embodiment, the liner may be operated at flow rates of from about 20 gpm to about 150 gpm per liner. In an additional embodiment, the liner may be operated at flow rates of from about 20 gpm, about 25 gpm, about 30 gpm, about 35 gpm, about 40 gpm, about 45 gpm, about 50 gpm, about 55 gpm, about 60 gpm, about 65 gpm, about 70 gpm, about 75 gpm, about 80 gpm, about 85 gpm, about 90 gpm, about 95 gpm, about 100 gpm, about 105 gpm, about 110 gpm, about 115 gpm, about 120 gpm, about 125 gpm, about 130 gpm, about 135 gpm, about 140 gpm, about 145 gpm, or about 150 gpm.

In an embodiment, the cyclonic deoiler may have an efficiency of removing oil of greater that about 20%, greater than about 25%, greater than about 30%, greater than about 35%, greater than about 40%, greater than about 45%, greater than about 50%, greater than about 55%, greater than about 60%, greater than about 65%, greater than about 70%, greater than about 75%, greater than about 80%, greater than about 85%, or greater than about 90%.

(c) Filtration Step

The process described herein filters further comprises a filtration step in which a water phase is fed through a filter system to produce a treated water stream.

In an embodiment, the filtration system may comprise a single membrane filter. In a different embodiment, the filtration system may comprise a series of at least two membrane filters.

In an embodiment, the filtration membrane(s) may comprise a polytetrafluoroethylene (PTFE) microfiltration membrane, a polytetrafluoroethylene (MF membrane), a graphene membrane, a ceramic membrane, or combinations thereof. In an embodiment, the filtration membrane may comprise an omniphilic, a hydrophobic, and an omniphobic grapheme filter coated on a mesh with pores ranging from about 150 μm to about 200 μm. In an embodiment, the filtration membrane may comprise an ion exchange resin. The ion exchange resin may comprise, without limit, hydrotalcite as an anion exchanger and permutite as a cation exchanger.

In an embodiment, the microfiltration membrane may have a pore size of from about 0.01 μm to about 200 μm. In some embodiments, the microfiltration membrane may have a pore size of from about 5 μm to about 200 μm.

In an embodiment, the filtration system may comprise a backwashable filter. In an embodiment, the backwashable filter may comprise at least one filter. Suitable filters include, but are not limited to, a bag filter, a cartridge filter, a microfilter, an ultrafilter, a media filter, a membrane filter, a polypropylene filter, a polytetrafluoroethylene (PTFE) filter, a TEFLON filter, a polyethersulfone (PES) membrane filter, a ceramic filter, a polymeric filter, a sand filter, an anthracite filter, a coal filter, a nutshell filter, a carbonate filter, a carbon filter, an activated carbon filter, and a mixed media filter.

In an embodiment, the backwashable filter system may comprise a backwash recovery tank. In an embodiment, the backwashable recovery tank comprises a water recycle feed line.

In some embodiments, an additive may be added to the backwash recovery tank. Suitable additives include, but are not limited, coagulants (e.g., polyamines, alum, aluminum chloride, polyaluminum chloride, ferric sulfate, ferrous sulfate, ferric chloride, and the like), flocculants (e.g., N,N-Dimethylaminoethyl Acrylate Methyl Chloride Quaternary, (N,N-Dimethylaminoethyl Methacrylate Methyl Chloride Quaternary, acrylamide, and the like), caustics (e.g., sodium hydroxide, caustic soda, and the like), and precipitating agents (e.g., sodium aluminate, and the like).

In an embodiment, the filtration step may be oxygen free.

In an embodiment, the cyclonic deoiler and filter system may be configured on a skid or similar platform to allow for a mobile, semi-permanent cyclonic deoiler. In another embodiment, the cyclonic deoiler and the filter system may be a permanent installation. A person of skill in the art would know the different types of platform that would allow a deoiler and filter system to be mobile and semi-permanent. In an embodiment, the mobile, semi-permanent cyclonic deoiler and filter system may be deployed for onshore salt water disposal.

In an embodiment, the cyclonic deoiler and the filter system may be operated in series or independently from one another. In some embodiments, the cyclonic deoiler and the filter system may be operated in series and in that order. In other embodiments, the cyclonic deoiler may be operated without the filter system. In still other embodiments, the filter system may be operated without the cyclonic deoiler.

(d) Treated Water Stream

The process described herein produces a treated water stream. In general, the treated water stream comprises a reduced content of hydrocarbons and solids as compared to the starting separated water stream.

In certain embodiments, the treated water stream may comprise a hydrocarbon concentration of less than about 0.01% by weight. In some embodiment, the treated water stream may comprise a hydrocarbon concentration of less than about 0.009%, less than about 0.008%, less than about 0.007%, less than about 0.006%, less than about 0.005%, less than about 0.004%, less than about 0.003%, less than about 0.002%, or less than about 0.001% by weight.

The treated water stream generally comprises a reduced content of suspended solids as compared to the starting separated water stream. In certain embodiments, the treated water stream may comprise a concentration of suspended solids of less than about 0.01% by weight. In some embodiments, the treated water stream may comprise less than about 0.0005%, less than about 0.0004%, less than about 0.0003%, less than about 0.0002%, or less than about 0.0001%.

The treated water stream generally comprises a reduced level of turbidity as compared to the starting separated water stream. In certain embodiments, the turbidity of the treated water stream may be less than about 20 NTU. In some embodiments, the turbidity of the treated water stream may be less than about 15 NTU, less than about 10 NTU, less than about 5 NTU, or less than about 1 NTU.

In certain embodiments, the treated water stream may have a pH of from about 5 to about 9. In some embodiments, the treated water stream may have a pH of about 5, about 5.5, about 6.0, about 6.5, about 7.0, about 7.5, about 8.0, about 8.5, or about 9.0.

(e) Downstream Uses of the Treated Water Stream

The treated water stream may be disposed or injected into an injection well. In specific embodiments, the treated water stream may be injected into a disposal well. In other embodiments, the treated water stream may be discharged into surface waters. In additional embodiments, the treated water stream may be injected into an injection well. In other embodiments, the treated water stream may be recycled back to the produced water tank for reuse.

The injected treated water stream may include a synergist. The synergist may be present in an amount of 1% to 20% by weight, based on total weight of the composition. The synergist may constitute about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, or about 20% by weight of the treated/corrosion inhibitor composition, based on total weight of the composition. The synergist may be present in an amount of about 8%, based on total weight of the composition.

Suitable synergists include compounds that enhance the corrosion inhibiting and/or scale inhibition, wax/paraffin and solids dispersant. The synergist may be a sulfur-containing compound, including but not limited to, thioglycolic acid, 3,3'-dithiodipropionic acid, thiosulfate, thiourea, 2-mercaptoethanol, L-cysteine, and tert-butyl mercaptan.

The injected treated water stream may include a solvent. The solvent may be present in an amount of 10% to 80% by weight, based on total weight of the composition. The solvent may constitute 20% to 60% by weight of the cleaner/corrosion inhibitor composition, based on total weight of the composition. The solvent may constitute about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, or about 60% by weight of the cleaner/corrosion inhibitor composition, based on total weight of the composition. The solvent may be present in an amount of about 42% by weight, based on total weight of the composition. The solvent may be methanol and is present in an amount of about 42% by weight, based on total weight of the composition.

Suitable solvents include, but are not limited to, alcohols, hydrocarbons, ketones, ethers, aromatics, amides, nitriles, sulfoxides, esters, and aqueous systems. The solvent may be water, isopropanol, methanol, ethanol, 2-ethylhexanol, heavy aromatic naphtha, toluene, ethylene glycol, ethylene glycol monobutyl ether (EGMBE), diethylene glycol monoethyl ether, or xylene. Representative polar solvents suitable for formulation with the composition include water, brine, seawater, alcohols (including straight chain or branched aliphatic such as methanol, ethanol, propanol, isopropanol, butanol, 2-ethylhexanol, hexanol, octanol, decanol, 2-butoxyethanol, etc.), glycols and derivatives (e.g., ethylene glycol, 1,2-propylene glycol, 1,3-propylene glycol, ethylene glycol monobutyl ether, etc.), ketones (cyclohexanone, diisobutylketone), N-methylpyrrolidinone (NMP), N,N-dimethylformamide, and the like. Representative non-polar solvents suitable for formulation with the composition include aliphatic hydrocarbons such as pentane, hexane, cyclohexane, methylcyclohexane, heptane, decane, dodecane, diesel, and the like; aromatic hydrocarbons such as toluene, xylene, heavy aromatic naphtha; and fatty acid derivatives (acids, esters, amides), and the like.

The solvent may be a solvent compatible with an arctic environment, as for example, methanol.

The injected treated water stream may optionally include one or more additives. Suitable additives include, but are not limited to, asphaltene inhibitors, paraffin inhibitors, scale inhibitors, emulsifiers, water clarifiers, dispersants, emulsion breakers, hydrogen sulfide scavengers, gas hydrate inhibitors, biocides, pH modifiers, and surfactants.

Suitable asphaltene inhibitors include, but are not limited to, aliphatic sulfonic acids; alkyl aryl sulfonic acids; aryl sulfonates; lignosulfonates; alkylphenol/aldehyde resins and similar sulfonated resins; polyolefin esters; polyolefin imides; polyolefin esters with alkyl, alkylenephenyl or alkylenepyridyl functional groups; polyolefin amides; polyolefin amides with alkyl, alkylenephenyl or alkylenepyridyl functional groups; polyolefin imides with alkyl, alkylenephenyl or alkylenepyridyl functional groups; alkenyl/vinyl pyrrolidone copolymers; graft polymers of polyolefins with maleic anhydride or vinyl imidazole; hyperbranched polyester amides; polyalkoxylated asphaltenes, amphoteric fatty acids, salts of alkyl succinates, sorbitan monooleate, and polyisobutylene succinic anhydride.

Suitable paraffin inhibitors include, but are not limited to, paraffin crystal modifiers, and dispersant/crystal modifier combinations. Suitable paraffin crystal modifiers include, but are not limited to, alkyl acrylate copolymers, alkyl acrylate vinylpyridine copolymers, ethylene vinyl acetate copolymers, maleic anhydride ester copolymers, branched polyethylenes, naphthalene, anthracene, microcrystalline wax and/or asphaltenes. Suitable dispersants include, but are not limited to, dodecyl benzene sulfonate, oxyalkylated alkylphenols, and oxyalkylated alkylphenolic resins.

Suitable scale inhibitors include, but are not limited to, phosphates, phosphate esters, phosphoric acids, phosphonates, phosphonic acids, polyacrylamides, salts of acrylamidomethyl propane sulfonate/acrylic acid copolymer (AMPS/AA), phosphinated maleic copolymer (PHOS/MA), and salts of a polymaleic acid/acrylic acid/acrylamidomethyl propane sulfonate terpolymer (PMA/AA/AMPS).

Suitable emulsifiers include, but are not limited to, salts of carboxylic acids, products of acylation reactions between carboxylic acids or carboxylic anhydrides and amines, and alkyl, acyl and amide derivatives of saccharides (alkylsaccharide emulsifiers).

Suitable water clarifiers include, but are not limited to, inorganic metal salts such as alum, aluminum chloride, and aluminum chlorohydrate, or organic polymers such as acrylic acid based polymers, acrylamide based polymers, polymerized amines, alkanolamines, thiocarbamates, and cationic polymers such as diallyldimethylammonium chloride (DADMAC).

Suitable dispersants include, but are not limited to, aliphatic phosphonic acids with 2-50 carbons, such as hydroxyethyl diphosphonic acid, and aminoalkyl phosphonic acids, e.g., polyaminomethylene phosphonates with 2-10 N atoms e.g. each bearing at least one methylene phosphonic acid group; examples of the latter are ethylenediamine tetra(methylene phosphonate), diethylenetriamine penta(methylene phosphonate), and the triamine- and tetramine-polymethylene phosphonates with 2-4 methylene groups between each N atom, at least 2 of the numbers of methylene groups in each phosphonate being different. Other suitable dispersion agents include lignin, or derivatives of lignin such as lignosulfonate and naphthalene sulfonic acid and derivatives.

Suitable emulsion breakers include, but are not limited to, dodecylbenzylsulfonic acid (DDBSA), the sodium salt of xylenesulfonic acid (NAXSA), epoxylated and propoxylated compounds, anionic cationic and nonionic surfactants, and resins, such as phenolic and epoxide resins.

Suitable additional hydrogen sulfide scavengers include, but are not limited to, oxidants (e.g., inorganic peroxides such as sodium peroxide or chlorine dioxide); aldehydes (e.g., of 1-10 carbons such as formaldehyde, glyoxal, glutaraldehyde, acrolein, or methacrolein; and triazines (e.g., monoethanolamine triazine, monomethylamine triazine, and triazines from multiple amines or mixtures thereof).

Suitable gas hydrate inhibitors include, but are not limited to, thermodynamic hydrate inhibitors (THI), kinetic hydrate inhibitors (KHI), and anti-agglomerates (AA). Suitable thermodynamic hydrate inhibitors include, but are not limited to, sodium chloride, potassium chloride, calcium chloride, magnesium chloride, sodium bromide, formate brines (e.g., potassium formate), polyols (such as glucose, sucrose, fructose, maltose, lactose, gluconate, monoethylene glycol, diethylene glycol, triethylene glycol, mono-propylene glycol, dipropylene glycol, tripropylene glycols, tetrapropylene glycol, monobutylene glycol, dibutylene glycol, tributylene glycol, glycerol, diglycerol, triglycerol, and sugar alcohols (e.g., sorbitol, mannitol)), methanol, propanol, ethanol, glycol ethers (such as diethyleneglycol monomethylether, ethyleneglycol monobutylether), and alkyl or cyclic esters of alcohols (such as ethyl lactate, butyl lactate, methylethyl benzoate).

Suitable kinetic hydrate inhibitors and anti-agglomerates include, but are not limited to, polymers and copolymers, polysaccharides (such as hydroxyethylcellulose (HEC), carboxymethylcellulose (CMC), starch, starch derivatives, and xanthan), lactams (such as polyvinylcaprolactam, polyvinyl lactam), pyrrolidones (such as polyvinyl pyrrolidone of various molecular weights), surfactants (such as fatty acid salts, ethoxylated alcohols, propoxylated alcohols, sorbitan esters, ethoxylated sorbitan esters, polyglycerol esters of fatty acids, alkyl glucosides, alkyl polyglucosides, alkyl sulfates, alkyl sulfonates, alkyl ester sulfonates, alkyl aromatic sulfonates, alkyl betaine, alkyl amido betaines), hydrocarbon based dispersants (such as lignosulfonates, iminodisuccinates, polyaspartates), amino acids, and proteins.

Suitable biocides include, but are not limited to, oxidizing and non-oxidizing biocides. Suitable non-oxidizing biocides include, for example, aldehydes (e.g., formaldehyde, glutaraldehyde, and acrolein), amine-type compounds (e.g., quaternary amine compounds and cocodiamine), halogenated compounds (e.g., 2-bromo-2-nitropropane-3-diol (Bronopol) and 2-2-dibromo-3-nitrilopropionamide (DBNPA)), sulfur compounds (e.g., isothiazolone, carbamates, and metronidazole), and quaternary phosphonium salts (e.g., tetrakis(hydroxymethyl)-phosphonium sulfate (THPS)). Suitable oxidizing biocides include, for example, sodium hypochlorite, trichloroisocyanuric acids, dichloroisocyanuric acid, calcium hypochlorite, lithium hypochlorite, chlorinated hydantoins, stabilized sodium hypobromite, activated sodium bromide, brominated hydantoins, chlorine dioxide, ozone, and peroxides.

Suitable pH modifiers include, but are not limited to, alkali hydroxides, alkali carbonates, alkali bicarbonates, alkaline earth metal hydroxides, alkaline earth metal carbonates, alkaline earth metal bicarbonates and mixtures or combinations thereof. Exemplary pH modifiers include sodium hydroxide, potassium hydroxide, calcium hydroxide, calcium oxide, sodium carbonate, potassium carbonate, sodium bicarbonate, potassium bicarbonate, magnesium oxide, and magnesium hydroxide.

Suitable surfactants include, but are not limited to, anionic surfactants, cationic surfactants, and nonionic surfactants. Anionic surfactants include alkyl aryl sulfonates, olefin sulfonates, paraffin sulfonates, alcohol sulfates, alcohol ether sulfates, alkyl carboxylates and alkyl ether carboxylates, and alkyl and ethoxylated alkyl phosphate esters, and mono and dialkyl sulfosuccinates and sulfosuccinamates. Cationic surfactants include alkyl trimethyl quaternary ammonium salts, alkyl dimethyl benzyl quaternary ammonium salts, dialkyl dimethyl quaternary ammonium salts, and imidazolinium salts. Nonionic surfactants include alcohol alkoxylates, alkylphenol alkoxylates, block copolymers of ethylene, propylene and butylene oxides, alkyl dimethyl amine oxides, alkyl-bis(2-hydroxyethyl) amine oxides, alkyl amidopropyl dimethyl amine oxides, alkylamidopropyl-bis (2-hydroxyethyl) amine oxides, alkyl polyglucosides, polyalkoxylated glycerides, sorbitan esters and polyalkoxylated sorbitan esters, and alkyl polyethylene glycol esters and diesters. Also included are betaines and sultanes, amphoteric surfactants such as alkyl amphoacetates and amphodiacetates, alkyl amphopripionates and amphodipropionates, and alkyliminodiproprionate.

The surfactant may be a quaternary ammonium compound, an amine oxide, an ionic or nonionic surfactant, or any combination thereof. Suitable quaternary amine compounds include, but are not limited to, alkyl benzyl ammonium chloride, benzyl cocoalkyl($C_{12}$-$C_{18}$)dimethylammonium chloride, dicocoalkyl ($C_{12}$-$C_{18}$)dimethylammonium chloride, ditallow dimethylammonium chloride, di(hydrogenated tallow alkyl)dimethyl quaternary ammonium methyl chloride, methyl bis(2-hydroxyethyl cocoalkyl($C_{12}$-$C_{18}$) quaternary ammonium chloride, dimethyl(2-ethyl) tallow ammonium methyl sulfate, n-dodecylbenzyldimethylammonium chloride, n-octadecylbenzyldimethyl ammonium chloride, n-dodecyltrimethylammonium sulfate, soya alkyltrimethylammonium chloride, and hydrogenated tallow alkyl (2-ethylhexyl) dimethyl quaternary ammonium methyl sulfate.

The injected treated water stream may further include additional functional agents or additives that provide a beneficial property. The amount of an additional agent or additive, when present, will vary according to the particular composition being manufactured and its intended use as one skilled in the art will appreciate.

Definitions

When introducing elements of the present disclosure or the preferred aspects(s) thereof, the articles "a", "an", "the" and "said" are intended to mean that there are one or more of the elements. The terms "comprising", "including" and "having" are intended to be inclusive and mean that there may be additional elements other than the listed elements.

The term "produced water" as used herein, refers to water separated from the production of stream and gas wells, including but not limited to tar sand wastewater, oil shale wastewater, water from steam assisted gravity drainage oil recovery process, and flowback water. Additionally, the term "produced water" may be used interchangeably with "production water."

The term "separated produced water" as used herein means the water output from a 3-phase separator. Produced water is fed into a 3-phase separator to separate oil, gas, and water and producing an oil stream, a gas stream, and a water stream.

The term "treated water stream" as used herein means the water following deoiling and filtration.

Another term for "cyclonic deoiler" as used herein may be a hydrocyclone.

EXAMPLES

The following examples are included to demonstrate various embodiments of the present disclosure. It should be appreciated by those of skill in the art that the techniques disclosed in the examples that follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

The following abbreviations are used herein: BPD=barrels per day; TSS=total suspended solids; gpm=gallons per Mcf; McF=thousand cubic feet of natural gas; NTU=Nephelometric Turbidity Units; and PDR=pressure differential ratio.

Example 1: Produced Water Composition

The chemical composition of produced water from a test site in the United States was determined by standard analysis techniques. These results are listed in Table 1.

TABLE 1

Produced Water Characteristics.

| Parameter | Unit | Concentration |
| --- | --- | --- |
| Suspended Solids | % weight | 0.04-0.4 |
| Total Iron | % weight | 0.006-0.013 |
| Hydrocarbon | % weight | 0.02-1 |
| Turbidity | NTU | >2,000 |
| Dissolved oxygen | % weight | $<2 \times 10^{-8}$ |
| $H_2S$ | % weight | <0.0005 |

The hydrocarbon and TSS content of produced water from two test sites in the United States was determined by standard analysis techniques. These results are listed in Table 2.

TABLE 2

Produced Water Hydrocarbon and TSS Characteristics.

| Test Site | Hydrocarbon (% weight) | TSS (% weight) |
| --- | --- | --- |
| A | 0.0005 | 0.0569 |
| A | 0.0059 | 0.121 |
| A | 0.559 | 0.14 |
| A | 0.008 | 0.227 |
| A | 0.0022 | 0.118 |
| B | 0.0009 | 0.077 |
| B | 0.00833 | 0.122 |

TABLE 2-continued

Produced Water Hydrocarbon and TSS Characteristics.

| Test Site | Hydrocarbon (% weight) | TSS (% weight) |
|---|---|---|
| B | 0.00772 | 0.0724 |
| B | 0.11 | 0.0638 |
| B | 0.00049 | 0.043 |

Example 2: Total Hydrocarbon Concentration Measurements

Total hydrocarbon concentration measurements were determined using the EPA Method 413.2. Briefly, produced water samples were acidified with hydrochloric acid to a pH ~2 and the hydrocarbons were extracted using Horiba S-316. The organic solvent containing the extracted hydrocarbons was then separated from the aqueous layer. Absorbance readings of the extracted hydrocarbon samples were performed using a Wilks Infracal 2 Trans-SP infrared spectrophotometer. The absorbance readings were then converted to hydrocarbon concentrations based on a calibration curve prepared using standard solutions. Samples containing high concentrations of hydrocarbons were diluted with the solvent to bring the absorbance readings within the linear calibration range.

Example 3: Deoiler Pilot Test

A cyclonic deoiler pilot test was setup according to the process diagram shown in FIG. 1. The deoiler pilot test was used to evaluate and select the most optimal deoiler liner for an oil field in the United States. The liners and testing parameters are listed in Table 3. Liner #1 and #2 are rated for higher capacity (up to 4,500 BPD) as compared to Liner #3 (up to 1,600 BPD). For each liner, a set of short experiments were performed by varying flow rate in an attempt to keep the PDR at about 2 and the reject rate at about 3-4%.

TABLE 3

Test Matrix.

| | Liner #1 (6" inlet and 13 mm reject port) | Liner #2 (6" inlet and 7 mm reject port) | Liner #3 (4" inlet and 7 mm reject port) |
|---|---|---|---|
| Feed Pressure (psi) | 90-100 | 90-100 | 90-100 |
| Reject Ratio (%) | 2-7 | 2-7 | 3-7 |
| PDR | 2-3 | 2-3 | 1.3-2 |
| Flow rate, gpm | 40, 49, 55, 66, 70, 80, 88, and 90 | 60, 55, 80, 40, 50, 85, and 90 | 50, 40, 35, 25, 20, and 15 |

For each flow rate, samples were collected from the inlet, water outlet, and reject streams every 30 minutes and the hydrocarbon concentration was analyzed as described in Example 2. The reject stream samples often required a 1,000 fold dilution as the hydrocarbon concentration of the reject streams were much higher than the measurement range.

Figure 3:
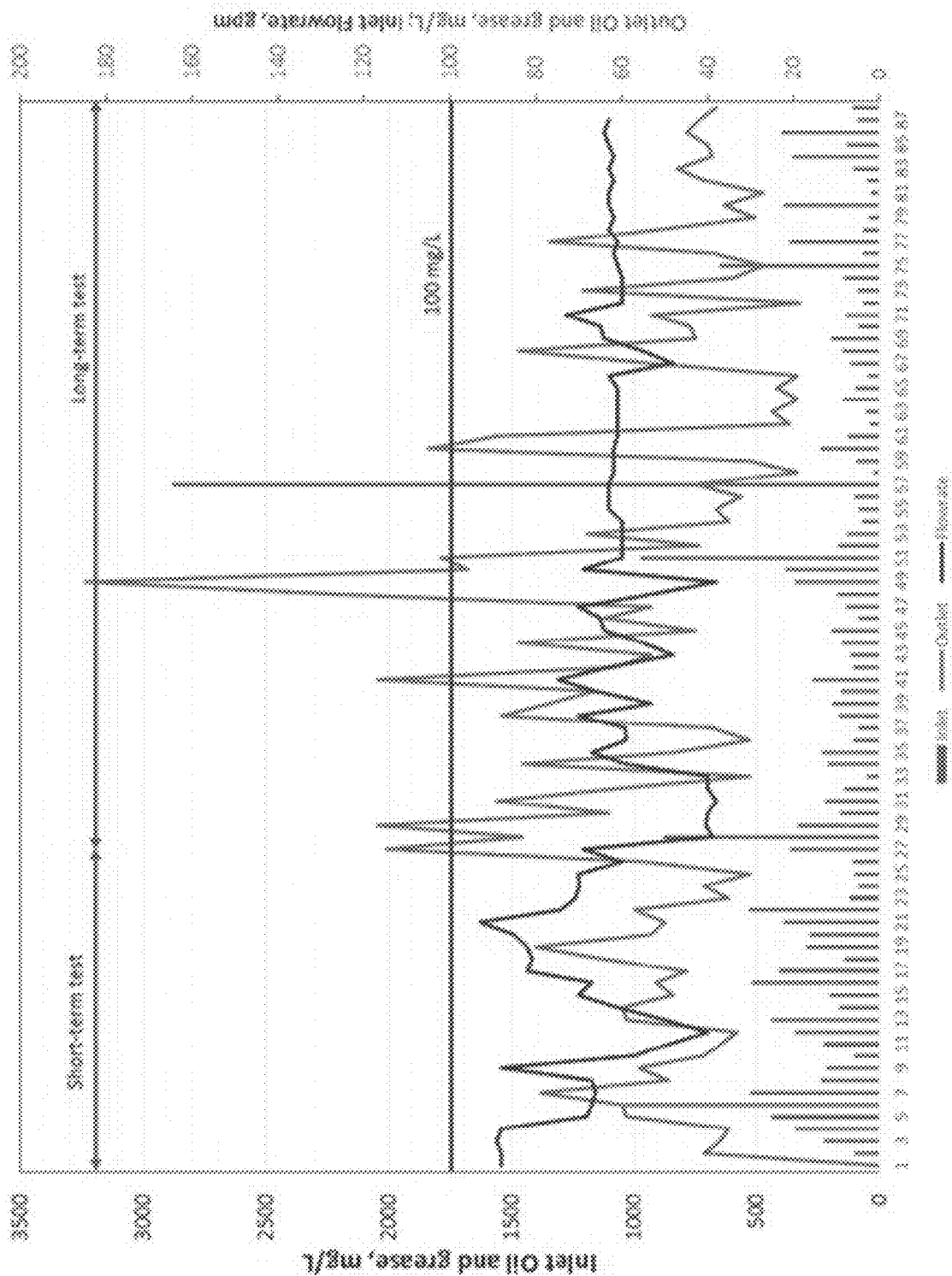
FIG. 3 depicts a graph showing the performance of Liner #1 for both short and long term pilot tests.

The performance of Liner #1 was evaluated at flow rates of 40, 49, 55, 66, 70, 80, 88, and 90 gpm, in that order, for a period of five days. During the short term tests, the inlet hydrocarbon concentration varied between 0.01% and 0.1% by weight. Regardless of the inlet hydrocarbon concentration, the hydrocarbon concentration in the water outlet stream was always less than 0.01% by weight and in many cases below 0.005% by weight (See FIG. 3).

Figure 4:
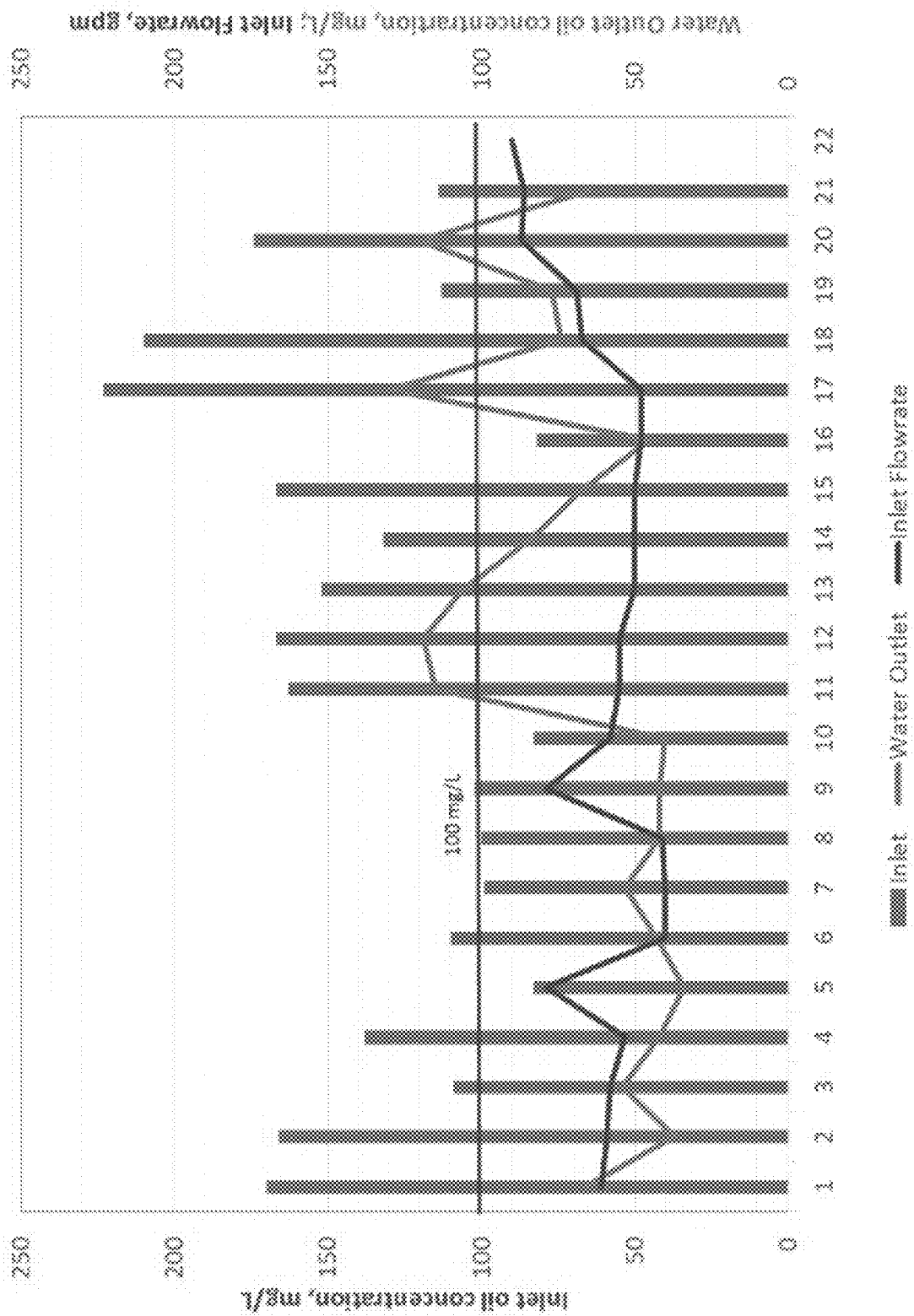
FIG. 4 depicts a graph showing the performance of Liner #2 for short term pilot tests.
Figure 5:
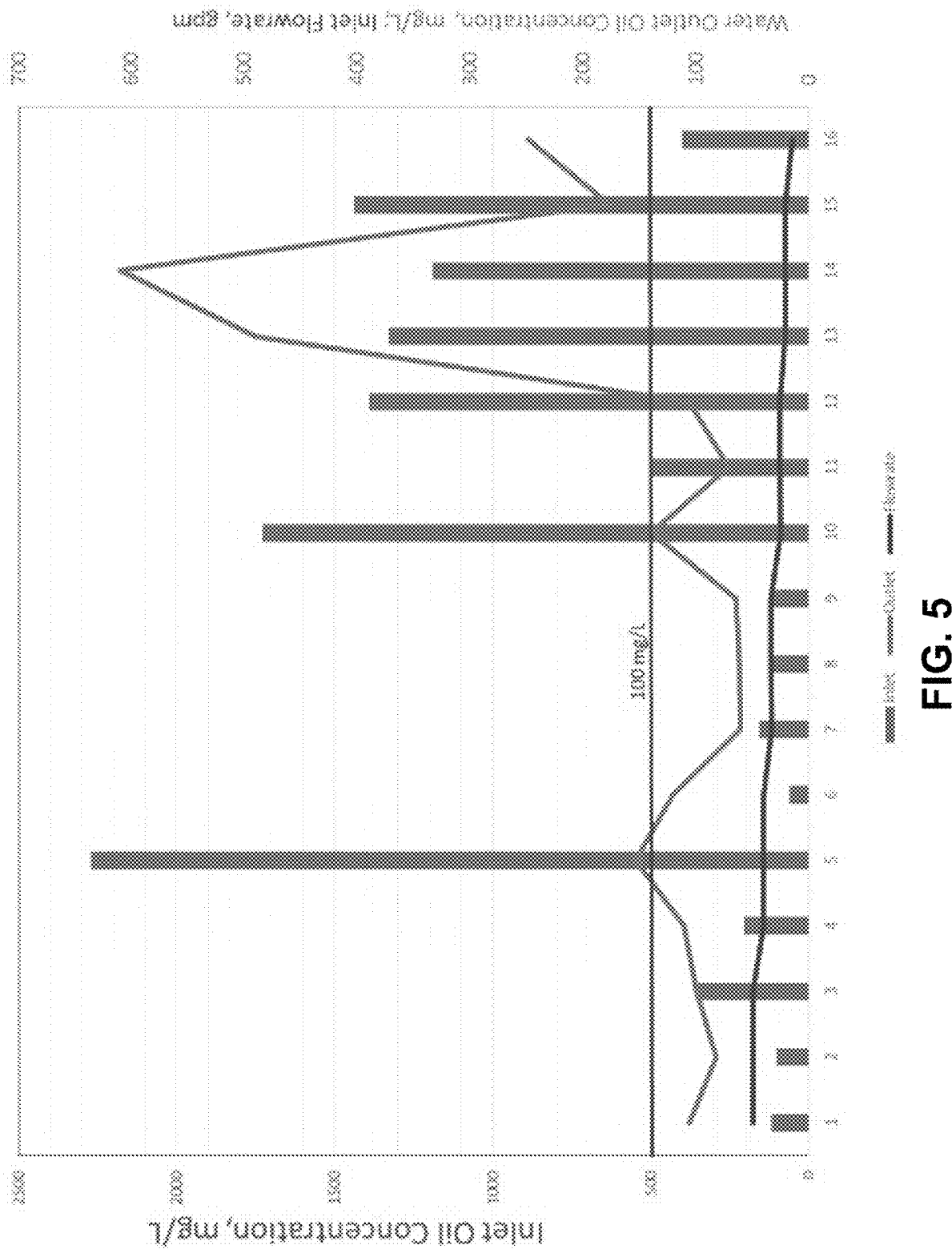
FIG. 5 depicts a graph showing the performance of Liner #3 for short term pilot tests.

The performance of Liner #2 was evaluated at flow rates of 60, 55, 80, 40, 50, 85, and 90 gpm, in that order, for a period of five days. During the short term tests, the inlet hydrocarbon concentration varied between 0.0075% and 0.0225% by weight. Additional, during the short term tests, no big plugs of oil were observed in the water outlet stream. The hydrocarbon concentration in the effluent stream varied between 0.0045% and 0.012% by weight (See FIG. 4). Out of the 21 measurements, only five were above the desired cutoff of 0.01% by weight (See FIG. 4).

The performance of Liner #3 was evaluated at flow rates of 50, 40, 35, 25, 20, and 15 gpm, in that order, for a period of three days. During the short term tests, the inlet hydrocarbon concentration varied between 0.01% and 0.23% by weight. Additionally, the water outlet oil concentration varied between 0.0082% and 0.061% by weight, which most excursions occurring at lower flow rates, i.e., below 26 gpm. At lower flow rates, the centrifugal force drops, which translate into poor efficiencies and a higher hydrocarbon concentration in the outlet stream.

Following the short-term experiments, Liner #1 was selected for further long-term testing which was conducted on a level-control mode to simulate an actual plant operating scenario. See FIG. 3 for hydrocarbon concentrations of inlet and outlet streams for both short term and long term pilot tests of Liner #1.

During the long-term tests of Liner #1, 94% of the hydrocarbon concentration measurements of the effluent water stream were below 0.01% by weight and in many cases below 0.005% by weight; however, there were five incidents when the hydrocarbon concentration exceeded 0.01% by weight. During this time, the hydrocarbon concentration of the inlet exceeded 0.01% by weight, and in some cases reached 0.1% to 0.3% by weight. Regardless of the hydrocarbon concentration of the inlet stream, the hydrocarbon concentration of the water outlet stream was always less than 0.01% by weight.

Figure 6:
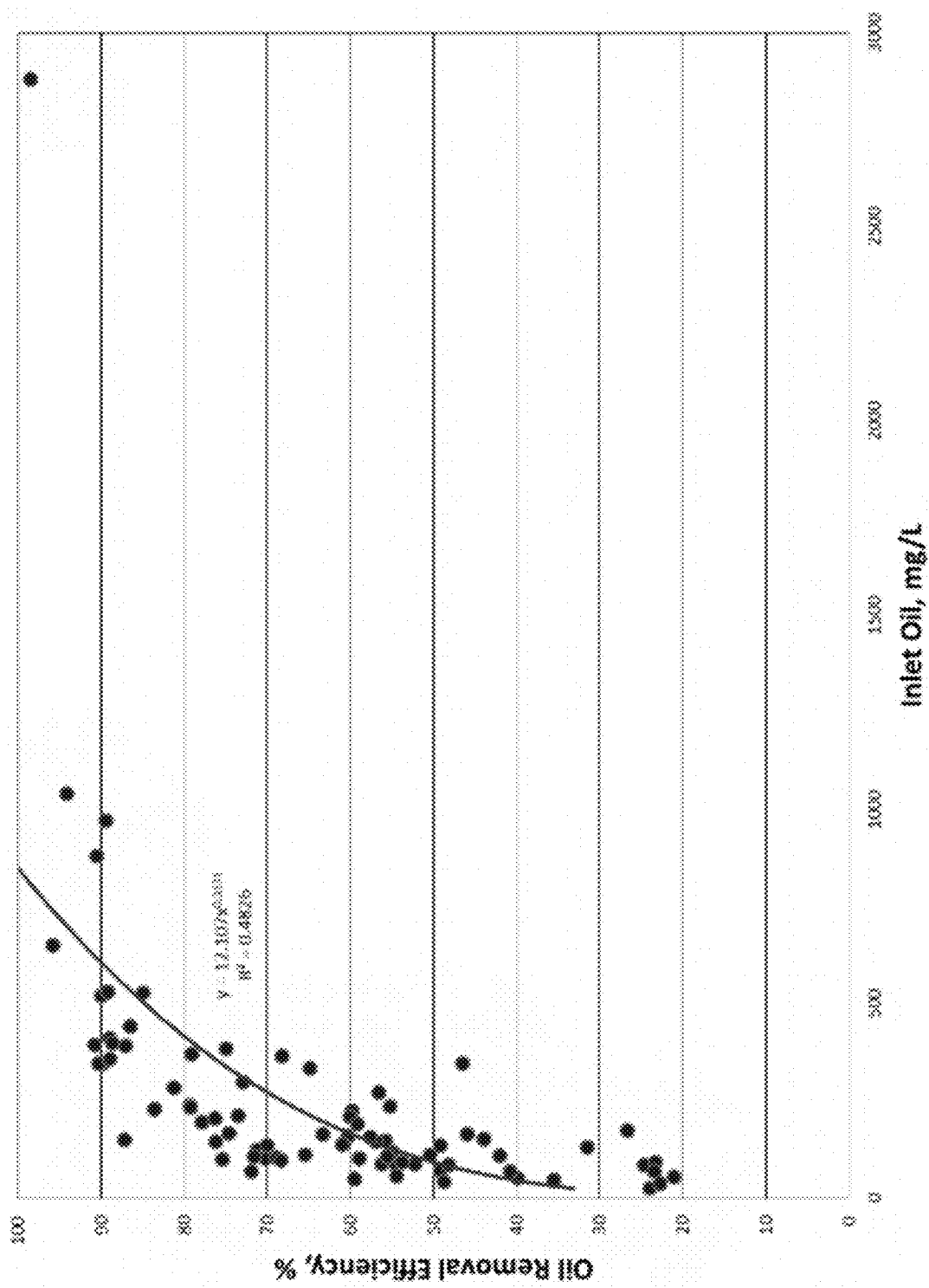
FIG. 6 depicts a graph showing the oil removal efficiency vs. inlet oil concentration using Liner #1.

A power law relationship was observed indicating that the performance of the liner improves with increasing concentration (See FIG. 6). It is important to note that the deoiler performance is dependent on the droplet size of the oil in the influent water stream. Dispersed oil removal performance improves as the droplet size and total amount of oil associated with the larger droplet size increases.

Figure 7:
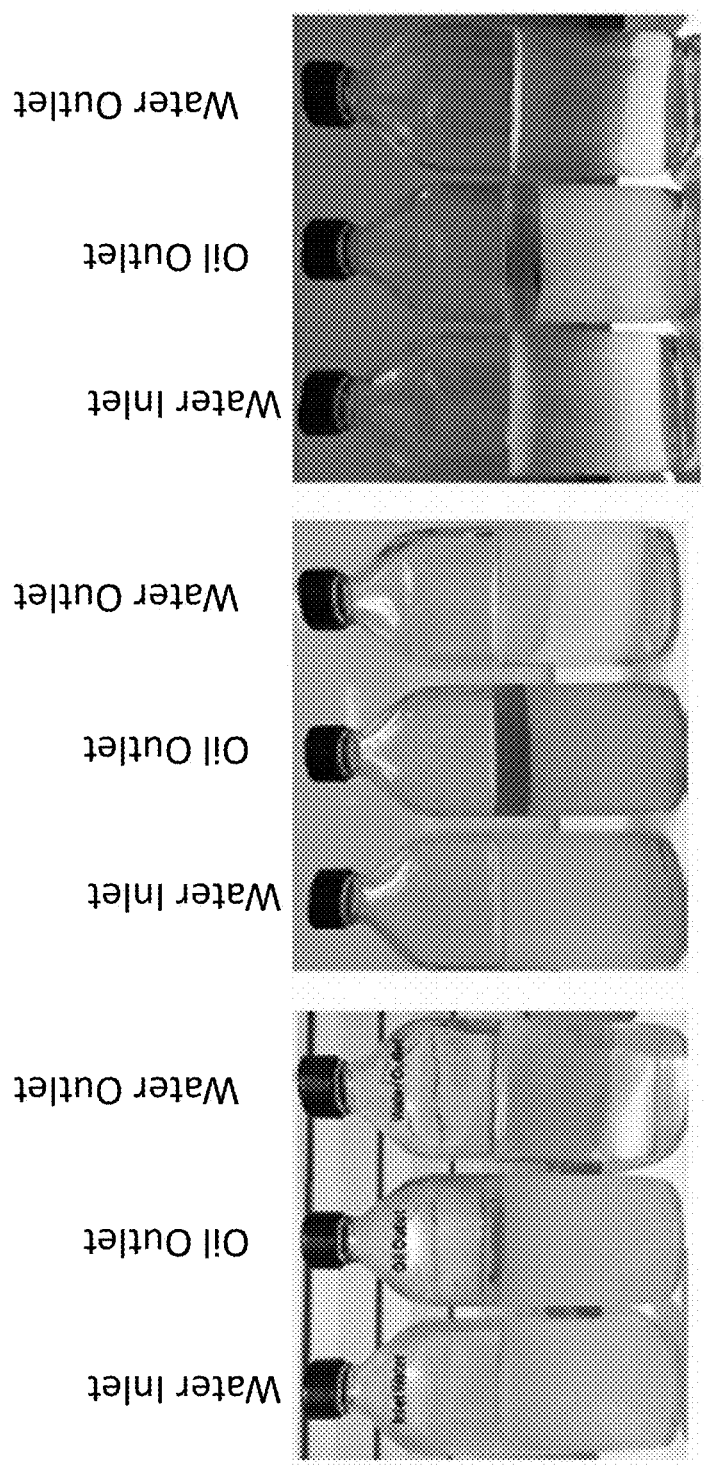
FIG. 7 depicts pictures of samples collected from the water inlet, oil outlet, and water outlet of the deoiler configured with Liner #1.
Figure 8A:
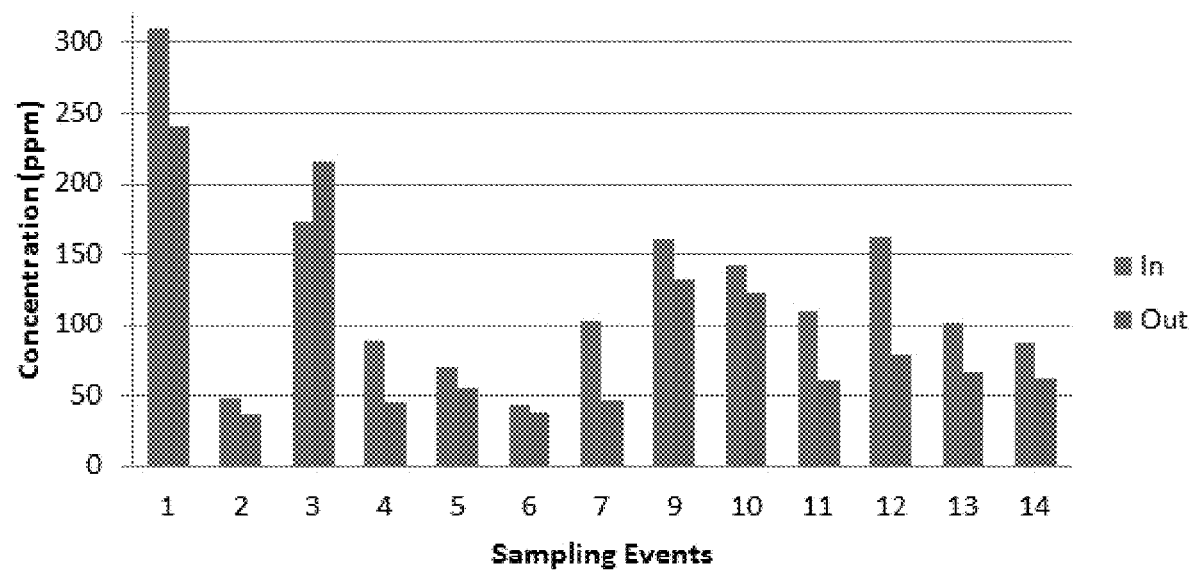
FIG. 8A, FIG. 8B, FIG. 8C, and FIG. 8D depict graphs showing performance data for two gun-barrels.
Figure 8B:
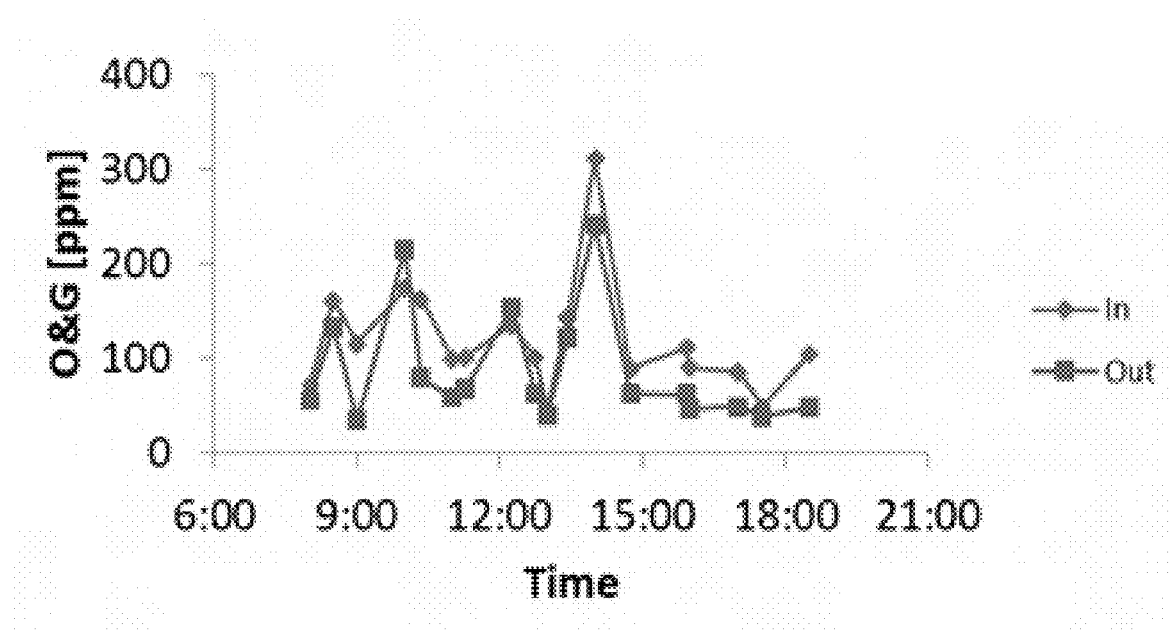
Figure 8C:
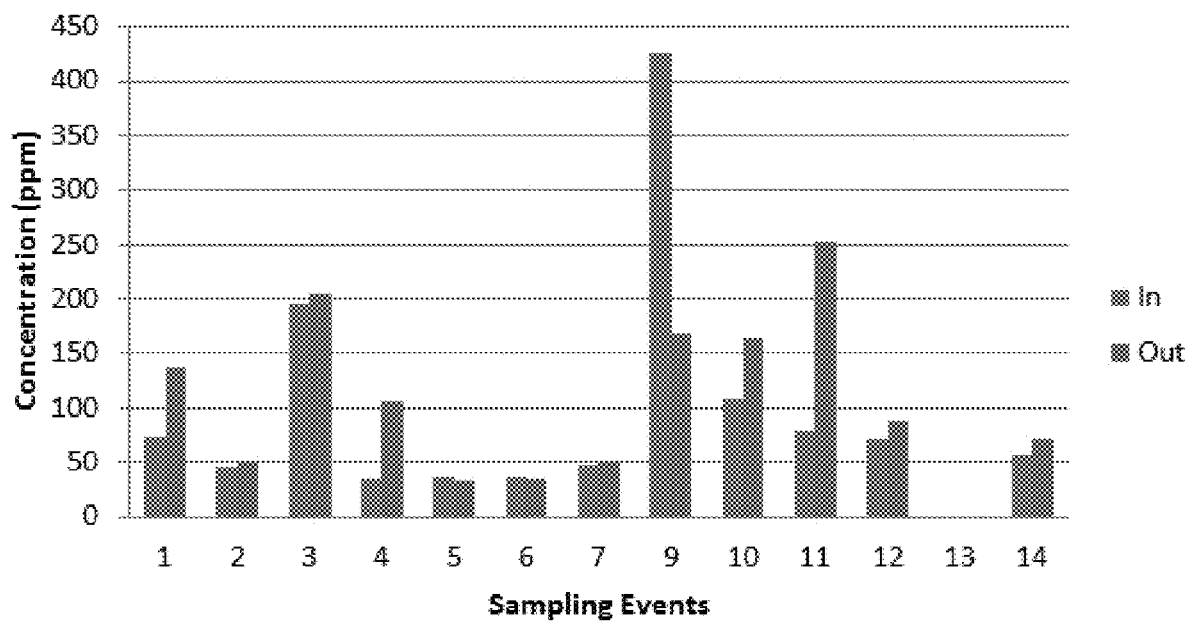
Figure 8D:
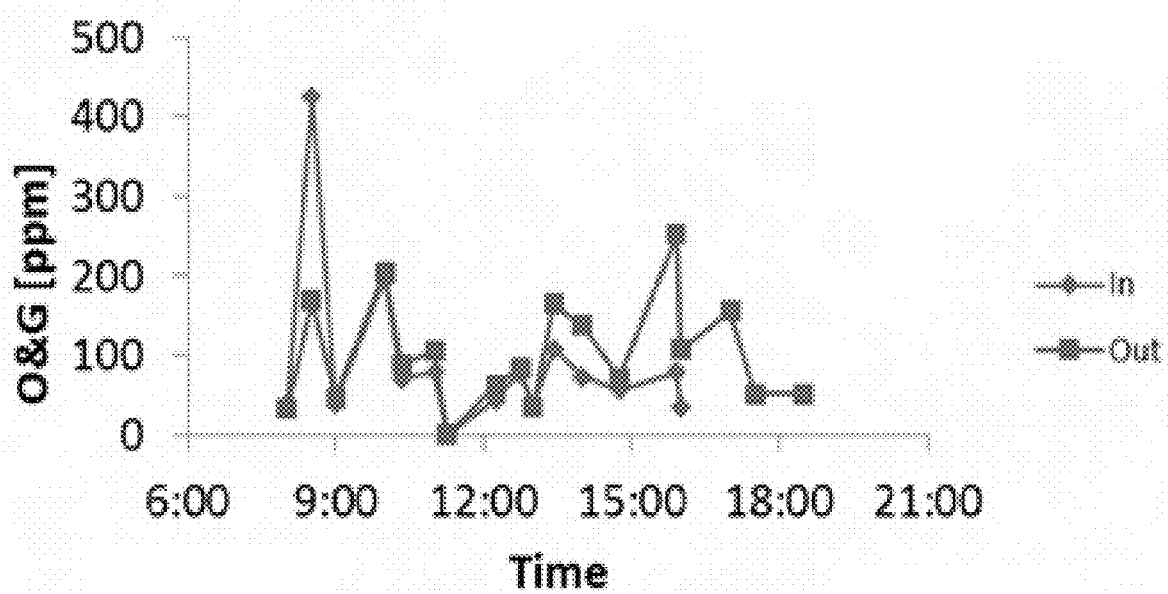

A visual comparison of inlet, clear water, and oily reject samples collected at different time intervals (See FIG. 7). Inlet, clear water, and oily reject samples were collected 4-6 times per day throughout the duration of the tests.

Example 4: Gun-Barrel Performance Test

Two gun-barrels in operation at an oil field in the United States were used to determine the performance of the gun-barrel technology. Produced water samples were collected at the inlet and outlet of the two gun-barrels and the outlet of a produced water storage tank located downstream of the gun-barrels over a period of six days. Samples were also collected at different times throughout the day to determine the impact of variations of the produced water quality on the performance of the gun-barrel. All of the produced water samples were analyzed for hydrocarbon concentration as described in Example 2.

The water outlet oil concentration from the gun-barrels is either similar to the inlet or higher than the inlet concentration, indicating poor removal of dispersed oil from produced water (See FIG. 8A, FIG. 8B, FIG. 8C, and FIG. 8D).

What is claimed is:

1. A process for producing a treated water stream, the process comprising:
    extracting produced water from a subterranean reservoir;
    feeding the produced water from the subterranean reservoir to a produced water tank;
    feeding the produced water from the produced water tank into a three-phase separator;
    forming a first phase from the produced water using the three-phase separator, the first phase being a separated gas stream;
    forming a second phase from the produced water using the three-phase separator, the second phase being a separated oil stream;
    forming a third phase from the produced water using the three-phase separator, the third phase being a separated water stream, the separated water stream having a hydrocarbon concentration of about 0.1% to about 7% by weight;
    processing the first phase, the second phase, and third phase separately by:
        compressing at least a portion of the separated gas stream for gas lift;
        transporting the separated oil stream to one or more oil systems; and
        feeding the separated water stream into a cyclonic deoiler;
    forming an oil phase and a water phase from the separated water stream using the cyclonic deoiler;
    feeding the water phase through a filter system including a backwash filter to remove solids thereby forming the treated water stream having a hydrocarbon concentration of less than about 0.01% by weight, the cyclonic deoiler and the filter system being mounted on a mobile platform; and
    recycling at least a portion of the treated water stream back to the produced water tank.

2. The process of claim 1, wherein the hydrocarbon concentration of the separated water stream is at least about 0.2% by weight.

3. The process of claim 1, wherein the cyclonic deoiler comprises a liner.

4. The process of claim 1, wherein the cyclonic deoiler comprises a plurality of liners.

5. The process of claim 4, wherein the plurality of liners comprises an inlet port and a reject port.

6. The process of claim 5, wherein the inlet port has a diameter of from about 127 mm to about 190 mm.

7. The process of claim 5, wherein the reject port has a diameter of from about 7 mm to about 15 mm.

8. The process of claim 4, wherein the plurality of liners has a flow rate of between about 30 gpm to about 90 gpm.

9. The process of claim 1, wherein the separated water stream enters the cyclonic deoiler at a pressure from about 50 to about 200 psi.

10. The process of claim 9, wherein the separated water stream enters the cyclonic deoiler at a pressure from about 90 to about 100 psi.

11. The process of claim 1, the cyclonic deoiler is operated at a G force of less than about 800 G.

12. The process of claim 10, wherein the cyclonic deoiler is operated at a G force of less than about 400 G.

13. The process of claim 1, wherein the cyclonic deoiler has a capacity of between about 1,500 bbl/day to about 225,000 bbl/day.

14. The process of claim 1, wherein the cyclonic deoiler is operated using counter-current spin.

15. The process of claim 1, wherein the cyclonic deoiler is operated using co-current spin.

16. The process of claim 1, wherein the cyclonic deoiler has an efficiency of removing hydrocarbons greater than about 40%.

17. The process of claim 1, wherein the backwash filter comprises a filter selected from a group consisting of a bag filter, a cartridge filter, a microfilter, an ultrafilter, a media filter, a membrane filter, a polypropylene filter, a polytetrafluoroethylene (PTFE) filter, a polyethersulfone (PES) membrane filter, a ceramic filter, a polymeric filter, a sand filter, an anthracite filter, a coal filter, a nutshell filter, a carbonate filter, a carbon filter, an activated carbon filter, a mixed media filter, and combinations thereof.

18. The process of claim 1, wherein the mobile platform is a skid.

19. The process of claim 1, wherein the treated water stream has a turbidity of less than about 20 NTU and has a total suspended solids content of less than about 0.01% by weight.

20. A system for producing a treated water stream, the system comprising:
    a produced water tank configured to receive produced water extracted from a subterranean reservoir;
    a three-phase separator disposed downstream from the produced water tank and configured to receive the produced water extracted from the produced water tank, the three-phase separator configured to form a separated water stream, a separated oil stream and a separated gas stream from the produced water, the separated water stream having a hydrocarbon concentration of about 0.1% to about 7% by weight, the separated oil stream in fluid communication with to one or more oil storage tanks; and
    a mobile platform including:
        a cyclonic deoiler mounted to the mobile platform, the cyclonic deoiler configured to receive the separated water stream from the three-phase separator and configured to form an oil phase and a water phase; and
        a filter system mounted to the mobile platform and configured to receive the water phase from the cyclonic deoiler, the filter system including a backwash filter configured to remove solids to form the treated water stream, the treated water stream having a hydrocarbon concentration of less than about 0.01% by weight, at least a portion of the treated water stream in fluid communication with the produced water tank.

* * * * *